United States Patent
Lynch et al.

[11] Patent Number: 5,943,387
[45] Date of Patent: Aug. 24, 1999

[54] METHOD AND DEVICE FOR EVALUATING CHANGES IN THE INTENSITY OF POLYCHROMATIC RADIATION AND CORRECTING ERRORS

[75] Inventors: John Lynch, Rueil Malmaison; Rogério Ferreira de Paiva, Paris, both of France

[73] Assignee: Institut Francais du Petrole, Rueil-Malmaison, France

[21] Appl. No.: 08/875,207

[22] PCT Filed: Oct. 25, 1996

[86] PCT No.: PCT/FR96/01669

§ 371 Date: Nov. 18, 1997

§ 102(e) Date: Nov. 18, 1997

[87] PCT Pub. No.: WO97/15842

PCT Pub. Date: May 1, 1997

[30] Foreign Application Priority Data

Oct. 27, 1995 [FR] France .................................. 95 13444

[51] Int. Cl.$^6$ .................................................... G01N 23/00
[52] U.S. Cl. .................................. 378/22; 378/25; 378/53
[58] Field of Search .................................. 378/21, 22, 25, 378/53; 250/253

[56] References Cited

U.S. PATENT DOCUMENTS 5,485,492  1/1996  Pelc ............................................. 378/5
5,533,080  7/1996  Pelc ............................................. 378/5

*Primary Examiner*—David Vernon Bruce
*Attorney, Agent, or Firm*—Antonelli, Terry, Stout & Kraus, LLP

[57] ABSTRACT

A method for evaluating changes in the intensity of polychromatic radiation that is transmitted by a source having a known frequency spectrum (e.g. an X-band spectrum), and received by a sensor after having passed through a certain thickness of a body or sample consisting of one or more phases having a known composition, whereby artifact-related reconstruction errors may be corrected. The method is characterized in that the changes in intensity are evaluated by modeling the influences of a number of predetermined parameters related to the nature of each phase on the absorption coefficient of the body in one or more spectral bands of the polychromatic radiation. The method is useful for the tomographic analysis of geological samples or the human body.

14 Claims, 3 Drawing Sheets

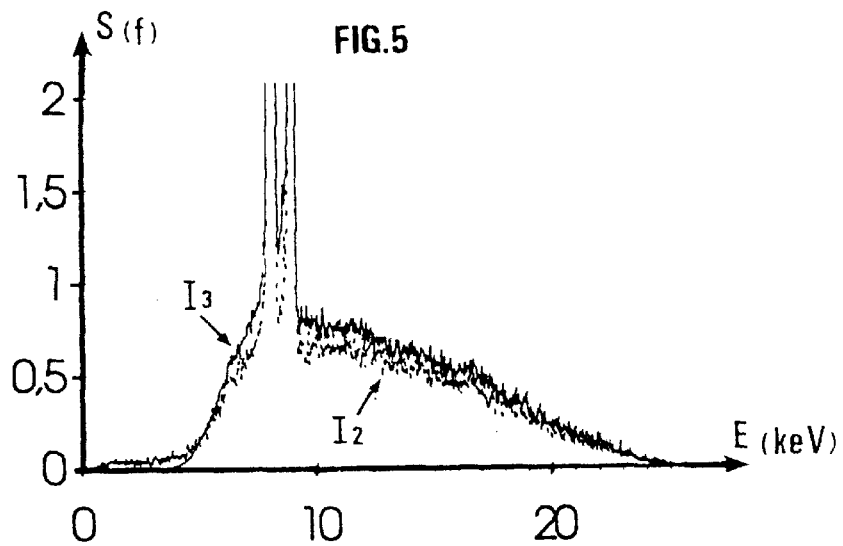
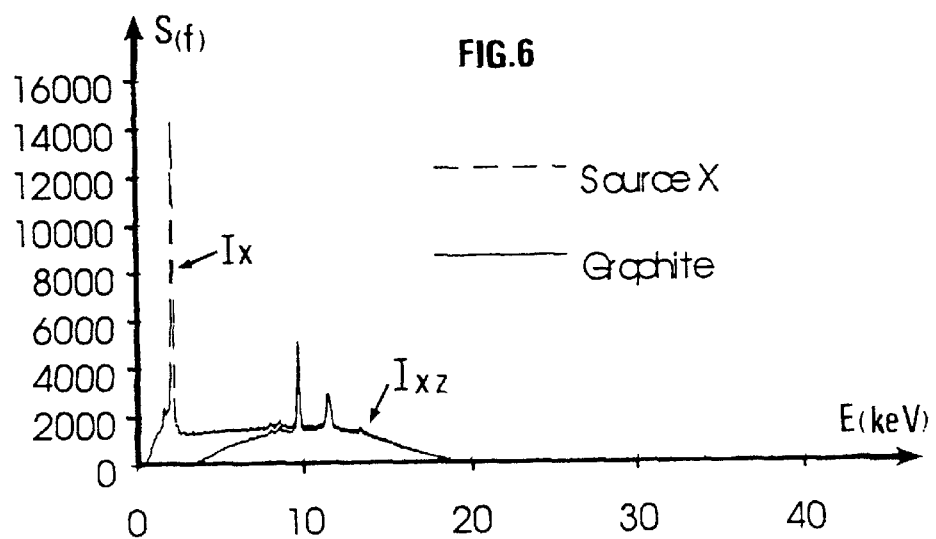
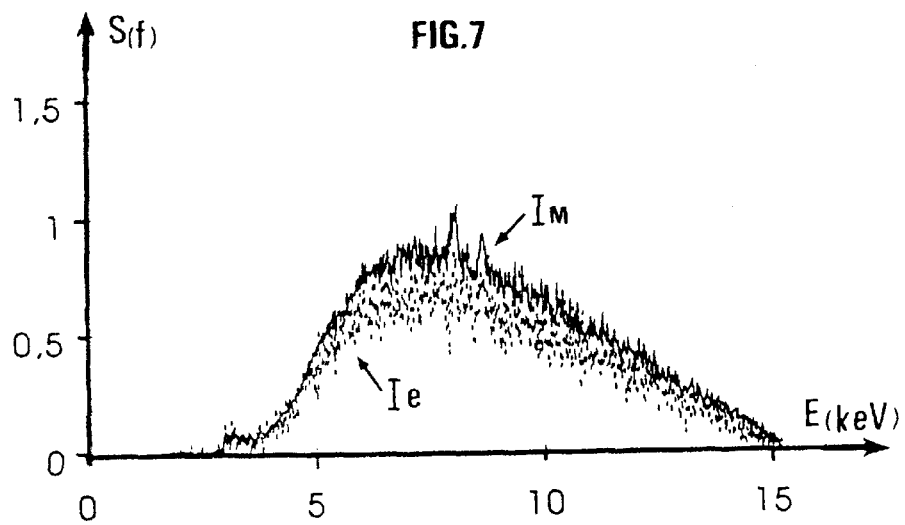

METHOD AND DEVICE FOR EVALUATING CHANGES IN THE INTENSITY OF POLYCHROMATIC RADIATION AND CORRECTING ERRORS

The present invention relates to a method of evaluating changes in the intensity of polychromatic radiation having a known frequency spectrum after it has passed through a certain thickness of a body consisting of one or more phases of a known composition, the purpose being to correct reconstruction or quantification artefacts.

The method of the invention allows various factors to be taken into account, for example: the chemical composition of the body, the energy distribution of the polychromatic beam, the elements making up the said body or changes in the absorption coefficient of the radiation, etc.

The method of the invention is particularly well suited to modelling and/or correcting the hardening of a beam of polychromatic radiation passing through an absorbent body.

Throughout the description, the terms "beam hardening" are used to denote the increase in the mean energy of a beam as it passes through an absorptive body.

The present invention is especially well suited to applications which simulate the hardening of a X-ray beam and for correcting the artefacts introduced by this hardening.

The method of the invention is applied in particular to measuring the "effective" thickness of a substance through which a polychromatic X-ray beam has passed in an absorptive body of a known chemical composition.

It can be applied, for example, as a means of determining the distribution and percentage of phases in a compound where the nature of the phases of which it is made up is known.

The method of the invention is especially suitable for applications involving rock characterisation, for example reservoir rocks in the petroleum industry.

When a beam of polychromatic radiation passes through an absorptive body, it undergoes a change which is specifically due to its interaction with the element or elements constituting this body. This being the case, the energy spectrum of the beam is different after it has passed through the body compared with what it was before. This change is due in particular to the energies contained in the spectrum and may vary depending on the position of the zone through which the beam has passed and its thickness.

Since the lowest energy values are associated with a high absorption coefficient, they produce the highest hardening artefacts in the majority of cases.

In the case of applications which are quantitative by nature, it is useful to have a method that will take account of any uncertainties which come into play due to the polychromatic nature of the radiation.

A certain number of methods have been described in the prior art as a means of minimising or even eliminating the uncertainties inherent in the polychromatic nature of the radiation.

One of the methods is to use a filter, for example a plate made from a material which absorbs at least some of the radiation and more specifically the weakest energies. However, this method has a disadvantage in that some of the beam is absorbed, causing a loss in intensity.

In another method, a calibration is undertaken using a model or reference sample. However, such a sample must be homogeneous in composition and must exhibit an attenuation close to that of the object to be analysed and it is not always possible to meet these two selection criteria.

Consequently, these methods do not provide an easy solution to the phenomena introduced by the polychromatic nature of the beam.

The objective of the method of the invention is to evaluate the change in the intensity of polychromatic radiation having a known frequency spectrum after it has passed through a certain thickness of a body or object consisting of one or more phases of a known composition, the purpose being to correct the errors or artefacts linked to the polychromatic nature of the radiation.

It is characterised in that this change in intensity is evaluated by building a model to represent the influence of a certain number of defined parameters linked to the nature and the physical-chemical properties of each of the phases which affect the absorption coefficient of the body in one or more spectral bands of polychromatic radiation.

The model used to define the change in intensity is defined by the following modelling function I(E):

$$I(E_i) = I_o(E_i) \exp\left\{ \sum_k \left[ L_k \cdot \rho_k \cdot \sum_{j,k}^{f} \left(\frac{\mu}{\rho}\right)_{j,k} \right] \right\}$$

I—>intensity of the X-radiation
$E_i$—>energy of the channel i of the spectrum X
$L_k$—>length crossed in the phase k
$\rho_k$—>density of the phase k
$f_{jk}$—>fraction of the element j in the phase $$\left(\frac{\mu}{\rho}\right)_{j,k}$$

—>mass attenuation coefficient for each element j of the phase k.

To set up this model, the respective influencing factors of characteristic parameters of a plurality of successive layers through which the radiation has passed are modelled.

In one embodiment, the change in intensity is selectively evaluated for one or more frequency bands of the radiation.

It is possible to select the energy of the incident radiation so as to eliminate the too low energies, for example, which introduce factors of uncertainty into the measurements.

In one method of implementing the invention, a comparison is made between the change in intensity measured after passing through a certain zone of a body to be analysed and the variation values derived from the model in order to determine at least one parameter which is characteristic of the body under analysis.

Knowing the composition of the analysed body, it is possible to determine the effective thickness of the zone through which radiation has passed or, if the body being analysed is known, determine the concentration of one or more constituents of the zone through which the radiation has passed.

When attempting to determine the texture of a body or object, a series of intensity measurements is taken on radiation which has passed through at least one zone of the body being analysed by varying the angle of incidence of the radiation relative to this zone and each of the said measured values is linked to an intensity value determined on the basis of polychromatic radiation and an intensity value determined on the basis of monochromatic radiation, these said values then being used to derive the composition of the said zone through which the radiation has passed.

It is an advantage to use polychromatic radiation emitted along several directions and determine the distribution of one or more constituents of the body in at least one zone through which the said radiation has passed.

The present invention also relates to a device used to establish the tomography of a body made up of several phases of a known composition, for example, and/or evaluate the change in intensity of polychromatic radiation of a known frequency spectrum after it has passed through a certain thickness of the said body.

The device comprises an enclosure in which the body is placed, for example, a source of polychromatic radiation, at least one device for detecting the radiation after it has passed through the body, a unit whose specific function is to retain the body inside the said enclosure, a rotary shaft, the retaining unit having at least one guide of a length "L" which surrounds the rotary shaft across at least a portion of its length and the body is linked to one end of the rotary shaft. The device is characterised in that the value of the ratio of the length L of the guide to the distance d separating the reconstructed section of the body is greater than or equal to 1.

In one embodiment, the guide is linked to a support joined to a wall of the enclosure by means which allow it to be moved within the enclosure. Consequently, it is possible to move the sample, controlling its position and the distance over which the sample has been moved, in order to increase the accuracy with which the section of the analysed body is reconstructed, for example.

In one embodiment, the guide is joined to the column by an auxiliary means which allows the body to be moved along the longitudinal axis of the column or a transverse axis.

The source of polychromatic radiation is joined to the guide and/or support, for example.

The method may be used to simulate the hardening of polychromatic radiation which has passed through a body, for example, or alternatively to characterise a sample, such as a rock or composite sample, as would occur in the petroleum industry.

The method of the invention has advantages when applied in any field of analysis based on X-ray imaging. In particular, it provides better ability to discriminate between phases than the conventionally used techniques.

The method and device of the invention also have advantages when applied to the study of porous media, for example in the fields listed below as examples, which is not exhaustive by any means:

in mineralogy as a means of identifying the minerals within a rock and studying their distribution.

in fluid mechanics in porous media, as a means of defining the geometry of grains or pores and the way they inter-connect, for example, these being parameters which have a not inconsiderable effect on the behaviour of the fluid circulating in them, in rock mechanics, as a means of verifying the degree of micro-fissuring in rock samples, for example, as a means of monitoring rock reservoirs by tomography.

In fields other than the petroleum industry, the method of the invention has advantages when used to monitor texture by tomography, as with composite materials for example, and more generally for the study of bodies by tomography.

Other features and advantages of the method of the invention will become clear from the description below, given by way of illustration and not restrictive, and with reference to the accompanying drawings, in which:

FIG. 5 is a schematic illustration of the respective spectra Sf of the polychromatic radiation of X-rays after passing through the sample, the first (I2) being measured and the second (I3) being derived from the model;

FIG. 6 is a schematic illustration of the respective spectra Sf of the polychromatic radiation of X-rays, the first (Ix) being that of the source and the second (Ixf) being filtered through a graphite plate;

FIG. 7 is a schematic illustration of the respective spectra Sf of the polychromatic radiation of X-rays, the first (Ie) being that obtained experimentally after passing through a filter and the analysed sample whilst the second (IM) is the corresponding spectrum obtained by the model;

Figure 1A:
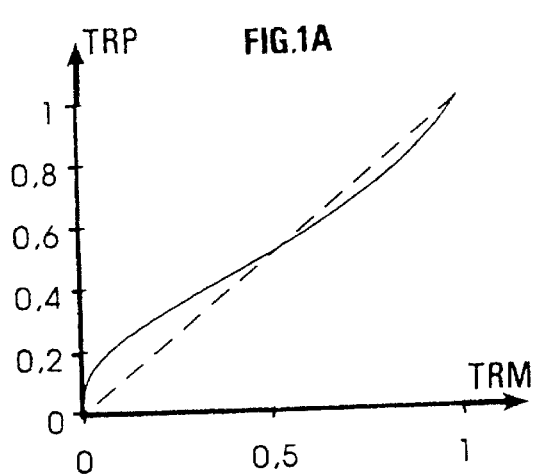
FIGS. 1A and 1B are tables showing the correspondence between the transmittance values observed for a polychromatic beam (TRP) and the transmittance values for a monochromatic beam (TRM) for two intensity values.

The energy spectrum of a beam emitted from polychromatic radiation passing through an absorbent body is altered due in particular to its interaction with the chemical elements of which the body is made up. This change also depends on the energy values of the beam since the absorption coefficient or attenuation coefficient of the body varies as a function of the energy.

The body is made up of several chemical species as well as several phases of different natures.

If a monochromatic beam is passed through a body made up of different chemical elements and several phases, it is possible to determine the intensity of the beam after it has passed through the body by applying Beer-Lambert's Law, which is expressed in the following way, for example:

$$I = I_0 \exp(-\mu t)$$

where I is the intensity of the monochromatic beam which has passed through the body, $I_0$ is the intensity of the beam before passing through the body, t is the thickness of the body and $\mu$ is the absorption coefficient linked to the energy of the monochromatic beam, determined by taking account of the effective absorption sections and the atomic densities of the elements.

However, this formula is not valid in the case of polychromatic radiation because of the energy distribution of the spectrum of such beams.

By way of illustration and not restrictively in any respect, the implementing method of the invention is explained below in the context of polychromatic radiation, for example a X-ray beam passing through a body made up of different chemical elements and possibly having phases of different natures.

It is also known that the artefacts or uncertainties inherent in measurement depend on the thickness of the material.

The procedure involves the following steps, for example:

Assuming that the chemical and mineralogical composition of the body through which the X-ray is passed is known, the parameters indicative of this composition are stored in memories, in a micro-computer memory for example, in the form of data tables, since the chemical elements making up the phases, the density of these phases and the attenuation coefficient by mass for each chemical element j of a phase k are known, it will be possible to derive the attenuation coefficient by mass of the beam in each of these phases, on the basis of a hypothetical distribution of the phases k or a prior knowledge of their distribution, it is possible to evaluate the distance or thickness $L_k$ through which the beam has effectively passed, i.e. the distance which takes account of the angle of incidence of the beam relative to an axis of the body.

furthermore, the energy spectrum of the incident beam before passing through the body has been pre-stored, for example in the form of a table of intensity/energy values.

On the basis of these data, the intensity value I of the beam which has passed through at least one phase k over a length $L_k$ is determined for a given energy value Ei, using the following relationship, for example:

Modelling function (1):

$$I(E_i) = I_o(E_i) \exp \left\{ \sum_k \left[ L_k \cdot \rho_k \cdot \sum_{j,k}^{f} \left(\frac{\mu}{\rho}\right)_{j,k} \right] \right\}$$

I—>intensity of the X-radiation
$E_i$—>energy of the channel i of the spectrum X
$L_k$—>length crossed in the phase k
$\rho_k$—>density of the phase k
$f_{jk}$—>fraction of the element j in the phase $$\left(\frac{\mu}{\rho}\right)_{j,k}$$

—>mass attenuation coefficient for each element j of the phase k.

In the implementing method of the invention given above as an example, the body is modelled by sub-dividing it as a function of the phases of different nature contained in it.

This gives rise to a series of polychromatic transmittance values (TRP) for each layer which is a specific function of the effective thickness through which the beam has passed. In parallel, the selected transmittance for several monochromatic beams (TRM) of energy is calculated for each thickness or layer $C_i$.

The sub-division step is specifically selected in relation to the desired accuracy and/or as a function of the characteristic dimensions of the phases.

Figure 3:
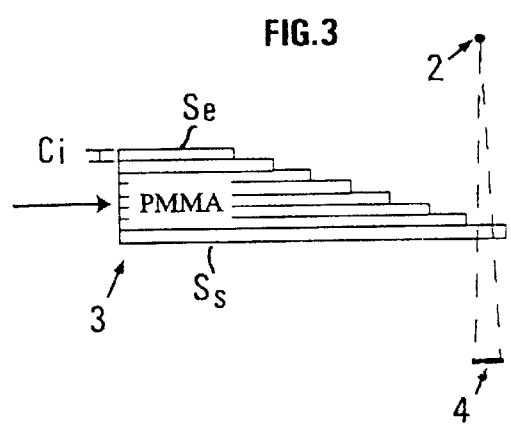

The initial intensity of the beam taken into account in the equation can be an intensity obtained for the previous layer using simulation function 1. FIG. 3 illustrates an absorbent body 3, for example, which was modelled by stacking layers of thicknesses $C_i$, each corresponding to a phase of a different nature, for example.

The method of the invention can be used to simulate the hardening of the beam of polychromatic radiation, for example.

The simulation function (1) is used to determine the cumulative transmittance by integration at each layer. A table of correspondence can then be drawn up between the polychromatic transmittance (TRP) and the monochromatic transmittance (TRM).

Figure 1B:
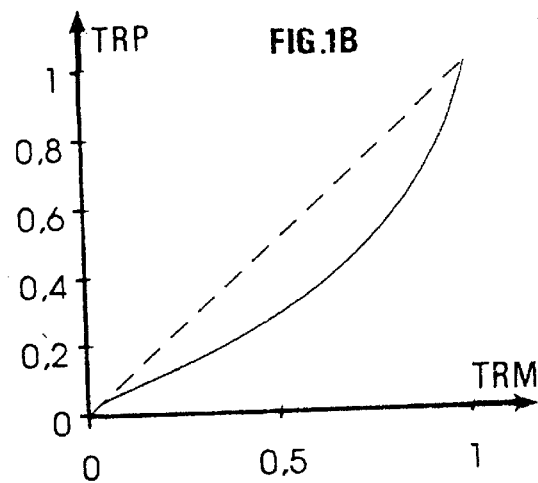

FIGS. 1A and 1B are graphs showing two example of conversion tables obtained in this way and relate respectively to monochromatic beams having an energy of 14 keV and 10 keV for a quartz sample and a source of X-radiation on a gold target.

The method applied to the simulation can be verified by using an electronic scanning microscope of the JEOL JSM-35CF type fitted with a Si(Li) diode, linked to a Tracor TN 5500 analysis system.

The theory underlying the system of validating the method of the invention is to create X-radiation by means of an electron beam hitting a metal target, which is applied to a body or object to be analysed and using a detector such as a spectrometer to measure, during a first period, the spectrum of the X-ray source (used as an input datum for modelling) and then in a second period the spectrum of the X-rays after they have passed through the absorbent body which will be compared with a spectrum obtained using the spectrum of the X-ray source to which the simulation function (1) was applied for all the energy intensity values.

The data relating to the spectrum of the X-ray source before and after passing through the sample, as well as the simulation function, are stored in the memory of a microcomputer 11 (FIG. 8) for example.

Figure 2:
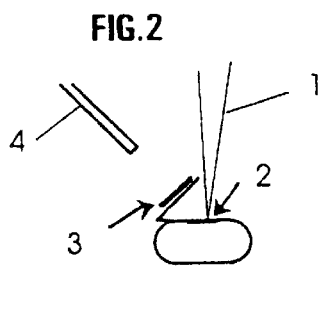
FIGS. 2, 3 are schematic illustrations of an embodiment set up to validate the method of the invention.

In the theory diagram of FIG. 2, the polychromatic X-ray source is a synchrotron type radiation for example, or possibly a source produced by bombarding a target 2 with an electronic beam 1, generating X-rays in the direction of the sample or absorbent material 3. The radiation emitted from the sample is picked up by a detector 4 such as a spectrometer positioned so that it will pick up the spectrum of the X-radiation which has passed through the absorbent body. The body 3 located between the source and the detector 4 has an intake surface S3 located on the side of the X-radiation and an output surface Ss located on the side of the detector 4 (FIG. 3).

The X-ray beam is directed at an angle of incidence α relative to a plane of the body, that of its intake face, for example. In FIG. 3, the X-radiation passes through the body in a direction perpendicular to its intake surface Se and is altered as it leaves the output surface Ss of the body before being picked up by the spectrometer 4.

Figure 4:
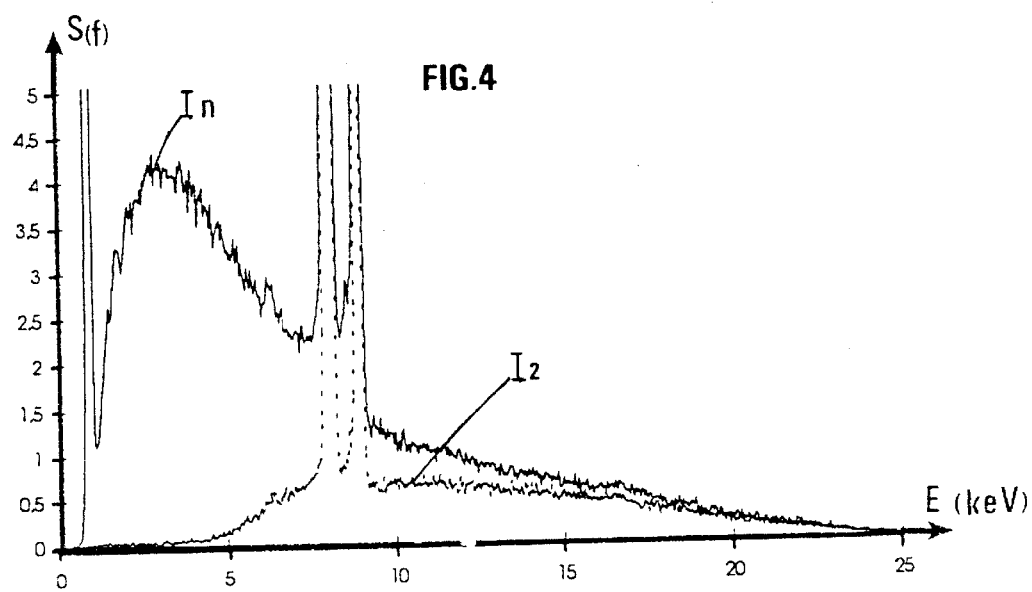
FIG. 4 is a schematic illustration of the respective spectra Sf of radiation before they have passed through a sample (I1) and after they have passed through it (I2)

FIGS. 4 and 5 give the simulation results obtained where the absorbent body is a sample of polymethyl methacrylate (PMMA) of about 1 mm thickness.

FIG. 4 shows the spectra given by the curves $I_1$ and $I_2$ and measured respectively from the X-ray source before and after passing through a sample of PMMA of a thickness of 1 mm.

The acceleration voltage of the electrons is 25 kV in this example and the target chosen is a copper sheet 1 μm thick. The copper supplies a main spectral line at 8 keV, this energy representing an attenuation of about 47%. The curve $I_2$ of FIG. 4, however, shows that energies lower than 5 keV are almost totally attenuated and that the attenuation of the spectrum is about 36%.

The modelling function (1) is applied to each of the energy values of the curve $I_1$ and the corrected intensity values represented by the curve $I_3$ on FIG. 5 are determined.

It will be noted that the spectra of the polychromatic radiation of rays after passing through a sample, respectively those measured and denoted by reference $I_2$ on FIG. 4 and those simulated denoted by reference $I_3$ on FIG. 4, are essentially identical and that the intensity values of the beam determined using the modelling function (1) are therefore essentially identical to the intensity values measured by the spectrometer 4 after passing through the sample, which demonstrates that this simulation method is valid.

In another embodiment of the invention, a filter can be used to attenuate the low energies of the spectrum or a high-pass filter, these latter being responsible for the more important artefacts and hence the greatest increase in hardening.

FIGS. 6 and 7 validate the simulation method applying the function (1).

The curves $I_x$ and $I_{xz}$ show respectively the spectrum of intensity of the beam obtained for a X-ray source and the spectrum of intensity of the beam filtered using a graphic filter.

FIG. 7 gives the curve $I_e$ of the intensity values of the beam measured after it has passed through the sample or body and the graphic filter.

The modelling function (1) is applied to each of the energy values of the curve $I_{sz}$ of FIG. 6 assimilating the body modelled in the function by the unit comprising the absorbent body and the filter and the corrected intensity values which are shown on the curve $I_M$ are determined.

It is clear that the two curves $I_e$ and $I_M$ are substantially identical and the modelling function (1) is therefore valid for a device comprising a filter in addition to the body to be modelled.

Advantageously, one way of implementing the method allows the thickness of a sample whose chemical and mineralogical composition is known to be determined.

The procedure is, for example, as follows:
- the reference model is set up by determining series of intensity values for monochromatic radiation using the modelling function (1) for different energy values and for different layers $C_i$, and these data are stored in memory, in the micro-computer for example,
- a series of intensity measurements is then taken on the polychromatic beam of X-rays after passing through the sample and the data are stored in the micro-computer and are so for several zones of the sample,
- each of the measured intensity values is then compared with the values determined for the model and the model is then assigned the closest intensity value which it generated, for example, and
- knowing that a thickness or layer CP is linked to an intensity value, the value of the effective thickness of the zone through which the beam passed is then derived.

By effective thickness is meant the actual thickness of solids penetrated, taking account of the angle of incidence of the X-radiation. Since the angle of incidence of the beam is known, it will be possible to trace back to the value of the thickness penetrated.

The method of the invention can also be used to determine the concentration of an element and/or a phase contained in a body, whose chemical and/or mineralogical nature is known.

The method can be used, for example, to determine the concentration of platinum in a catalyst such as an aluminium matrix. The method works on the assumption that the thickness is known and the transmitted intensity values which correspond to the values of platinum and/or aluminium concentration are calculated. These intensity values are then stored in memory, for example in the form of a pair in a table (X-ray beam intensity, composition of a chosen phase).

The intensity of the X-radiation which has passed through the body to be analysed is then measured, i.e. the matrix and the element, and this measured value is compared with the derived values stored in the data table.

In exactly the same way as with the method described above, the measured intensity value is assigned the closest derived intensity and the value of the concentration is determined for a given element.

Without departing from the scope of the invention, this approach can also be extended to determining the percentage of a phase in a known matrix, for example when seeking to determine the quantity of feldspar in a reservoir rock.

The method of determining the change in intensity of a X-ray beam which has passed through a sample can be used to advantage in applications involving tomography and in particular to produce microtomographs of a sample.

Most of the known computer programmes used for tomograph reconstruction are designed to handle monochromatic beams. It is therefore necessary to get round the problem of the polychromatic nature of the radiation beam by correcting measured data using the method described above, for example.

Figure 8:
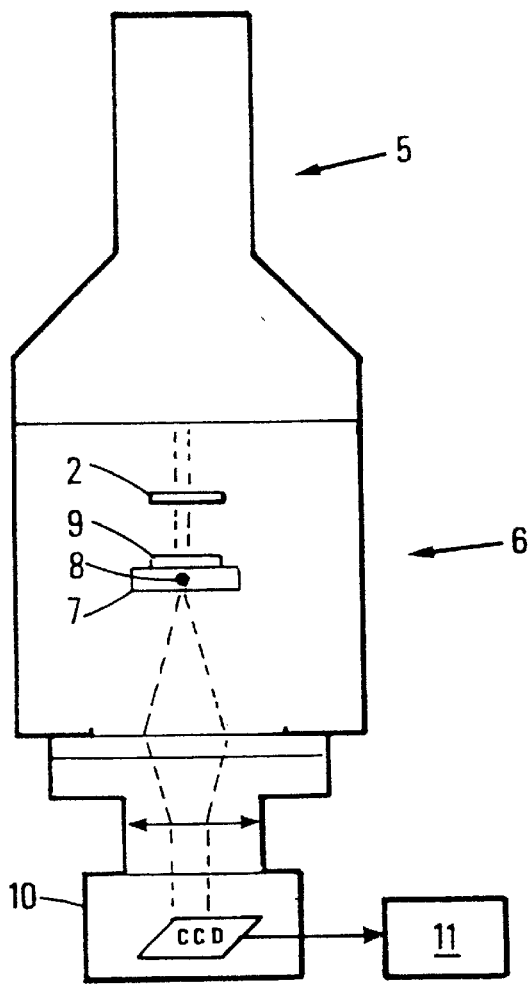
FIG. 8 is a schematic illustration of an example showing how the method can be applied to produce the tomography of a sample.

FIG. 8 is a schematic illustration of a micro-tomograph which has the specific advantage of obtaining information at the level of resolution in the micrometre range.

The resolution obtained for the measurements varies between 0.5 and 10 $\mu$m and preferably between 1 and 5 $\mu$m.

The micro-tomograph illustrated in FIG. 8 consists of two parts, a column 5 and a drawer 6, for example. The column is a column of a conventional electronic microscope, for example, and will therefore not be described in detail. The drawer 6 has two targets 2 bombarded by the electronic beam which are the source of the X-radiation, having characteristics substantially identical to those described in relation to FIG. 4 (spectrum $I_1$). Inside this drawer 6 is a sample-holder 7 joined to a rotary shaft 8 on which the sample 9 is positioned. The rotary shaft 8 allows the sample to be moved as indicated by the arrow in the drawing, its lateral movement being effected by moving the unit comprising the rotary shaft and sample-holder in translation.

Figure 9:
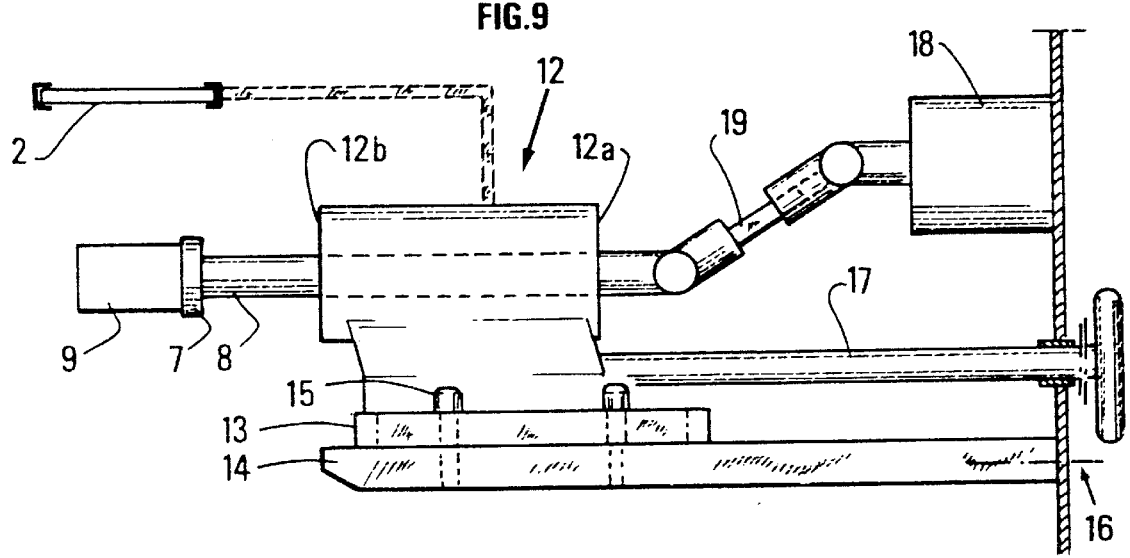
FIG. 9 is a schematic illustration of an embodiment of a device of the invention which allows an improved resolution to be obtained.

FIG. 9 illustrates a detail of another embodiment of the device of FIG. 8 which will specifically improve the tomographic resolution.

By the expression "reconstructed" section is meant the section of the sample or body reconstructed, perpendicular to the rotary shaft, and which is defined by the position of the polychromatic radiation source and the position of the detector.

The device has the various elements listed below and arranged in the following way:
- a guide 12, with two ends 12a and 12b and a length L, is disposed around the rotary shaft 8 in a conventional manner so that the rotary shaft retains its movement in displacement and possibly in translation,
- the guide is joined to a shoe 13 which slides on a support 14 by means of a guide screw 15,
- the support 14 is joined to the wall of the column on a level with the drawer 6 by conventional fixing means 16, for example,
- the shoe is linked to a device 17 which crosses through the wall of the column, allowing it to be moved manually or automatically,
- the rotary shaft 8 is linked to a motor 18 by means of a set 19 of homo-kinetic joints in a manner known to the skilled person. These joints separate the motor and the guide and/or the displacements of this guide,
- the sample-holder 7 is fixed to one end of the rotary shaft 8 and supports the sample 9 to be analysed,
- "d" is defined as being the distance separating the end of the guide 12b farthest from the wall of the column of the reconstructed section of the sample.

To obtain a resolution within the above-mentioned range, the sample can be moved inside the column, so as to obtain several reconstructed sections of the sample, for example. The tomography of the sample can be reproduced from these reconstructed sections.

Advantageously, the device 17 is linked to a means for controlling the displacements so as to obtain the displacement value accurately and in order to optimise the cut of the different reconstructed sections.

Advantageously, the target 2 is joined to the guide, directly or indirectly, by conventional linking means, illustrated by the broken lines in the drawing. The drawing shows its direct link with the support.

This particular embodiment provides increased resolution, obtaining resolutions between 0.5 and 10 μm and preferably between 1 and 5 μm.

In another embodiment (not illustrated), the guide is joined directly to the column by conventional fixing means.

The sample can be rotated manually in multiples of 3° or more, for example, which corresponds to a maximum of 120 turns per complete rotation. Another approach is to automate the rotation using an appropriate device and an embodiment of this type would increase the number of steps to exceed 1200 steps per complete rotation.

The device 10 for detecting the beam which has passed through the sample comprises a CCD camera, for example, which can be linked to any device to prevent parasitic interference and increase the quality and accuracy of the measurements. The detection device 10 is also linked to a processing system 11 programmed to carry out the conventional methods of tomography and the method of the invention used to evaluate the change in intensity.

The energy of the electron beam is selected so as to maximise the production of photons of the spectral line selected, the upper limit being determined by the capacity of the high-voltage cell of the electronic column in this embodiment. The beam current is regulated to obtain an intense beam whilst retaining an electron probe of small dimensions.

The choice of steps at which the sample is rotated is set so as to produce a spatial resolution in the order of that of the projections, the number of projections M obeying the law whereby M is greater than or equal to π/2 *N where N is the number of pixels in a line of the projections.

The method then consists in acquiring a set of intensity values associated with the angles of rotation of the sample for a X-ray beam. This produces a data table grouping the measured intensity values Mi and the values of the angle βi.

Simultaneously, the intensity values $I_{Pi}$ are determined, corresponding to the incident spectrum and to different thicknesses of samples.

The intensity values $I_{Mi}$ were also obtained for several monochromatic beams within a range of energy values incorporating at least the energy values of the radiation spectrum applied to the sample and at different sample thicknesses so as to set up the reference model. These two sets of values are grouped in a single data table, for example, and stored in the micro-computer.

In accordance with the method, each of the measured intensity values $M_i$ is compared with the intensity values determined for the polychromatic beam $I_{Pi}$ and, once the comparison has been made, the measured value $M_i$ is replaced by the nearest determined value.

The value $I_{Pi}$ is then compared with the values obtained for the monochromatic beams and the intensity value retained is the one which would have been obtained if a monochromatic beam had been used, the nearest one, for example. It is this value which will be used by the tomography software to determine and characterise the zone of the sample penetrated.

Any processing methods which would improve the imaging resolution conventionally used in tomography may be used to gain further advantage without departing from the scope of the invention. This approach produces spatial information to tens of microns or less in comparison with the resolutions available in radiographic mode which is less than 3 μm.

The method has been described as applied to the tomographic analysis of objects or samples. It would not be a departure from the scope of the invention, however, if the method of the invention were applied to artefact corrections in tomography apparatus used on the human body, for example, such as X-ray scanners.

We claim:

1. A method for evaluating the change in intensity of polychromatic radiation with a known frequency spectrum, after it has passed through a certain thickness of a body consisting of one or more phases of known composition, the purpose being to correct the errors linked to the artefacts inherent in the polychromatic nature of the radiation, characterised in that this change in intensity is evaluated by modelling the effect of a certain number of defined parameters linked to the nature and physical-chemical properties of each of the phases on the absorption coefficient of the body in one or more spectral bands of the polychromatic radiation.

2. A method as claimed in claim 1, characterised in that the model used to evaluate the change in intensity is defined by the following relationship:

$$I(E_i) = I_o(E_i)\exp\left\{\sum_k \left[L_k \cdot \rho_k \cdot \sum_{j,k}^f \left(\frac{\mu}{\rho}\right)_{j,k}\right]\right\}$$

I—>intensity of the X-radiation
$E_i$—>energy of the channel i of the spectrum X
$L_k$—>length crossed in the phase k
$\rho_k$—>density of the phase k
$f_{jk}$—>fraction of the element j in the phase $$\left(\frac{\mu}{\rho}\right)_{j,k}$$

—>mass attenuation coefficient for each element j of the phase k.

3. A method as claimed in claim 1, characterised in that a model is built of the respective effects of characteristic parameters of a plurality of layers through which the radiation passes in succession.

4. A method as claimed in claim 1, characterised in that the change in intensity is selectively evaluated for one or more frequency bands of the radiation.

5. A method as claimed in claim 1, characterised in that the change in intensity measured after passing through a certain zone of a body to be analysed is compared with the variation values derived from the model to determine at least one characteristic parameter of the body under analysis.

6. A method as claimed in claim 1, characterised in that, since the composition of the body under analysis is known, a comparison is made to determine the effective thickness of the zone through which the radiation has passed.

7. A method as claimed in claim 5, characterised in that, since the thickness of the body under analysis is known, a comparison is made to determine the concentration of the zone through which the radiation has passed on the basis of one of more of its constituents.

8. A method as claimed in claim 5, characterised in that several intensity measurements are taken on the radiation after it has passed through at least the said zone of the body under analysis by varying the angle of incidence of the radiation relative to this zone, and an intensity value determined on the basis of polychromatic radiation and then an intensity value determined on the basis of monochromatic radiation is assigned to each of the said measured values and these values are used to derive the composition of the said zone through which the radiation has passed.

9. A method as claimed in claim 8, characterised in that the body under analysis is irradiated with a polychromatic X-ray beam along several directions and the distribution of the constituents of the body in at least one zone through which the radiation has passed is determined.

10. Use of the method as claimed in claim 1 to simulate the hardening of polychromatic radiation which has passed through a body.

11. Application of the method as claimed in claim 1 to the process of characterising a sample such as a rock sample and/or a composite in the field of the petroleum industry.

12. A device for producing the tomography of a body made up of one or several phases of known composition and/or to evaluate the change in intensity of polychromatic radiation with a known frequency spectrum after it has passed through a certain thickness of the said body, comprising at least one enclosure (6), the said enclosure being capable of containing the said body, a source of polychromatic radiation, at least one device (10) for detecting the radiation after it has passed through the said body, a unit to maintain the said body (9) inside the said enclosure, a rotary shaft (8), the said unit consisting of a guide (12) of a length "L" and surrounding the rotary shaft (8) over at least a part of its length, the said body being linked to one end of the rotary shaft, characterised in that the ratio of the length L to the distance d separating the reconstructed section of the body is greater than or equal to 1.

13. A device as claimed in claim 12, characterised in that the said guide is joined to a support (14) by means (13, 15) which allow it to be displaced inside the enclosure, the said support being joined to a wall of the enclosure.

14. A device as claimed in claims 12, characterised in that the source of polychromatic radiation is joined to the said guide or the said support.

* * * * *